United States Patent
Feldman

(10) Patent No.: US 9,465,214 B2
(45) Date of Patent: Oct. 11, 2016

(54) METHODS AND SYSTEMS FOR MANAGING A VEHICLE COMPUTER TO RECORD INFORMATION AND IMAGES

(71) Applicant: Ford Global Technologies, LLC., Dearborn, MI (US)

(72) Inventor: Casey Bryan Feldman, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/608,775

(22) Filed: Jan. 29, 2015

(65) Prior Publication Data

US 2016/0223813 A1 Aug. 4, 2016

(51) Int. Cl.
| | |
|---|---|
| *B60Q 1/00* | (2006.01) |
| *G09F 9/00* | (2006.01) |
| *G02B 27/01* | (2006.01) |
| *B60K 35/00* | (2006.01) |
| *H04N 7/18* | (2006.01) |
| *B60R 11/02* | (2006.01) |

(52) U.S. Cl.
CPC .............. *G02B 27/01* (2013.01); *B60K 35/00* (2013.01); *B60R 11/0235* (2013.01); *H04N 7/188* (2013.01)

(58) Field of Classification Search
CPC ........ H04N 7/188; H04N 7/18; B60K 35/00; B60R 11/0235

USPC ................ 340/461; 386/224, 227; 455/426.1
See application file for complete search history.

(56) References Cited

U.S. PATENT DOCUMENTS

| | | | | |
|---|---|---|---|---|
| 7,640,007 | B2 * | 12/2009 | Chen .................. | G05B 19/0423 455/426.1 |
| 8,136,138 | B2 | 3/2012 | Jira et al. | |
| 8,484,381 | B2 | 7/2013 | Fraley | |
| 8,781,292 | B1 | 7/2014 | Ross et al. | |
| 2003/0081935 | A1 * | 5/2003 | Kirmuss ................... | H04N 7/18 386/327 |
| 2006/0212195 | A1 | 9/2006 | Veith et al. | |
| 2008/0077882 | A1 * | 3/2008 | Kramer .................. | B60K 35/00 715/810 |
| 2011/0202862 | A1 * | 8/2011 | Kramer .................. | B60K 35/00 715/771 |
| 2015/0078727 | A1 * | 3/2015 | Ross ....................... | H04N 7/188 386/227 |

* cited by examiner

*Primary Examiner* — John A Tweel, Jr.
(74) *Attorney, Agent, or Firm* — Jennifer M. Stec; Brooks Kushman P.C.

(57) ABSTRACT

A vehicle recording event method and device to monitor one or more parameters at the vehicle based on a trigger condition during a vehicle drive event. The method may receive, via a vehicle computing system, a configuration from a handheld device to output at least a portion of one or more parameters at a heads-up display (HUD). The method may record the parameters during a vehicle drive event based on a trigger condition. The method may transmit the parameters to the handheld device for storage of the vehicle drive event.

20 Claims, 7 Drawing Sheets

METHODS AND SYSTEMS FOR MANAGING A VEHICLE COMPUTER TO RECORD INFORMATION AND IMAGES

TECHNICAL FIELD

The present disclosure relates to one or more applications for use with a vehicle, in particular to manage recorded information that provides vehicle operation information to a handheld device.

BACKGROUND

Vehicle data recorders have been integrated into vehicles to record one or more variables when an accident is detected. The one or more variables are recorded using inputs from video and global positioning systems. While this information may be helpful to a vehicle owner, it may not be preconfigured or enabled based on user input at a vehicle or remote device. Various other systems have been used to record vehicle data, although they may record preconfigured data variables that may not be configured by a user or communicated to other devices in communication with the vehicle.

SUMMARY

In at least one embodiment, a system includes a heads-up display (HUD) and at least one processor configured to communicate with the HUD and a handheld device. The HUD may be configured to output vehicle parameters. The at least one processor is further configured to transmit at least a portion of the parameters displayed by the HUD during a record event to the handheld device for storage of the record event.

In at least one embodiment, a vehicle recording event method monitors one or more parameters during a vehicle drive event. The method may receive, via a vehicle computing system, a configuration from a handheld device to output at least a portion of one or more parameters at a display. The method may record the parameters during a vehicle drive event based on a trigger condition. The method may transmit the parameters for subsequent transmission to the handheld device for storage of the vehicle drive event.

In at least one embodiment, a handheld device includes a user-interface display and a processor configured to communicate with a vehicle computing system (VCS). The user-interface display may be configured to receive an event file name and allow the selection of vehicle parameters for output by a vehicle display. The processor may be configured to transmit configuration data having the selected parameters to the VCS. The processor may be further configured to receive data associated with the vehicle parameters from the VCS based on a record event. The process may be further configured to store the data under the event file name.

DETAILED DESCRIPTION

Figure 1:
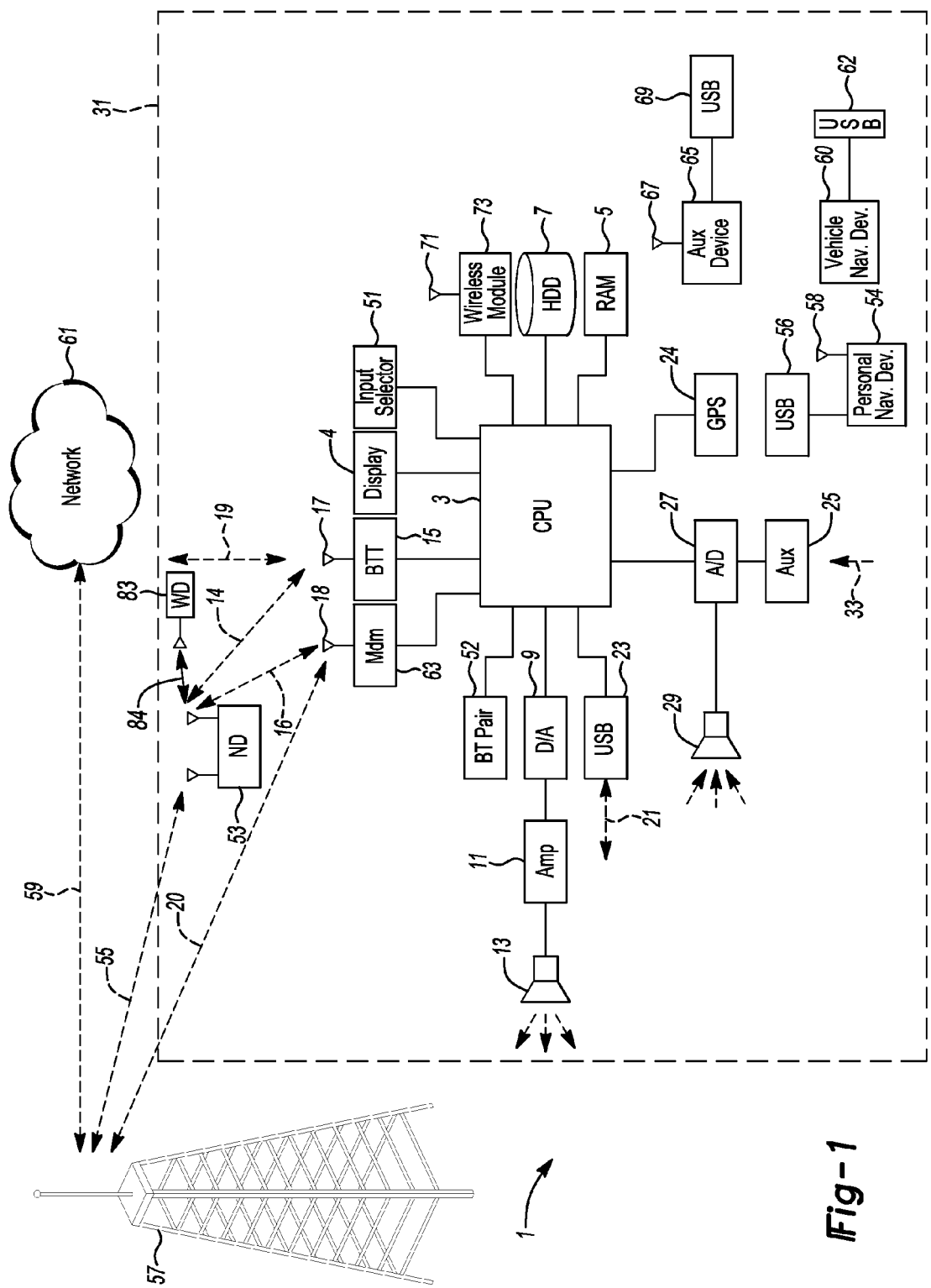
FIG. 1 is an exemplary block topology of a vehicle infotainment system implementing a user-interactive vehicle information display system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

A vehicle computing system may be configured to include the integration of one or more features using a single application communicating with a handheld device or family of devices, where the single application is configured to allow the user to control the handheld device or family of devices via a user interface of the application. While such an approach works with select handheld devices, it may be difficult to scale as the number and type of handheld devices grows. In the vehicle environment in particular, communication with a handheld device may provide for additional capabilities of the vehicle computing system.

An improved vehicle system may be configured to include features for monitoring vehicle performance with the use of an application. The system may include a handheld device interface configured to communicate with and control the monitoring of the vehicle and/or vehicle system. The functionality exposed by the handheld device interface may then be made available to the other applications of the vehicle system through an application programming interface (API), such that other applications of the vehicle may be able to communicate with the handheld device features. In an example, the API may be registered with a vehicle service configured to define access to the handheld devices of the system as well as associated supported functions. If an application of the vehicle would like to communicate with the handheld device, the application may request to do so using the exposed handheld device interface API. The handheld device interface may accordingly act as a broker to translate and perform the request of the calling application, including informing the requester of recorded data, errors, alarms, or received information from the controller handheld device.

In another example, the vehicle system may be configured to communicate vehicle information to the one or more handheld devices. The handheld device may receive the information from the vehicle system and output one or more messages. For example, the vehicle system may communicate vehicle information to the handheld device via the API of the system.

Once a handheld device is configured for use by the vehicle system, the system may be further configured to utilize a device scripting application to define scripting settings. The settings may include scripting triggers having conditions based on vehicle data and/or information received from the handheld device. The scripting triggers may have scripting actions to be requested by the device scripting application, and when the condition is satisfied, communicate with the handheld device via the handheld device interface. For example, the device scripting application of the system may utilize vehicle data such as vehicle speed, vehicle location, or other information obtained from the vehicle computing system as a trigger to communicate with the connected handheld device to automatically store information and/or output information at the device.

As a more specific example, a vehicle may maintain handheld device credentials allowing the handheld device interface to be able to connect to one or more systems in communication with the vehicle computing system. When the device scripting application of the vehicle receives information from the handheld device, such as a request to monitor one or more variables, or that a vehicle trigger event is detected, the vehicle system may utilize the information to communicate data to the handheld device. The system may further include a user interface facilitating the addition of this and other scenarios, without requiring the user to install a different application for each automation purpose.

Thus, the vehicle applications and device scripting application may have access to communicate with the handheld device(s), resulting in direct communication of vehicle information to the handheld device, and more overall functionality for the vehicle. Moreover the system may be able to manage when and how to control each handheld device, as well as provide appropriate feedback to a calling application when a handheld device has detected a request to record one or more vehicle parameters. Thus, by way of the communication, the vehicle may be able to present information to the vehicle occupant, transmit and store the information at the handheld device, and/or a combination thereof.

The vehicle computing system may output information that may assist the driver to manage one or more applications. The vehicle computing system may process information for display using one or more processors. The output information may be displayed at a heads-up display (HUD), user screen, at a speaker, an instrument cluster, and/or a combination thereof. For example, navigation information may be presented to the driver using the display and/or the speaker. Additional information may be communicated to the driver with the use of the HUD. The HUD provides a display that outputs the additional information on the windshield in the driver's line of sight of the road. The system may record one or more vehicle parameters while the driver follows the navigation directions. The system may transmit the one or more vehicle parameters to the handheld device for display and/or storage.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 and/or a HUD (not shown) located in the vehicle. The user may also be able to interact with the interface if it is provided, for example, with a touch sensitive screen. In another illustrative embodiment, the interaction occurs through button presses and/or a spoken dialog system with automatic speech recognition and speech synthesis.

In the illustrative embodiment shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof). For example, a camera system (not shown) for capturing images around the vehicle may be in communication with the VCS 1 via the vehicle network.

Outputs of the system may include, but are not limited to, the visual display 4, the HUD, and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other handheld device having wireless remote network connectivity). The handheld device 53 can then be used to communicate 59 with a network 61 outside the vehicle 31 through, for example, communication 55 with a cellular tower 57. In some embodiments, tower 57 may be a WiFi access point.

Exemplary communication between the handheld device 53 and the BLUETOOTH transceiver is represented by signal 14.

Pairing a handheld device 53 and the BLUETOOTH transceiver 15 can be instructed through a button 52 or similar input. Accordingly, the CPU is instructed that the onboard BLUETOOTH transceiver will be paired with a BLUETOOTH transceiver in a handheld device.

Data may be communicated between CPU 3 and network 61 utilizing, for example, a data-plan, data over voice, or DTMF tones associated with nomadic device 53. Alternatively, it may be desirable to include an onboard modem 63 having antenna 18 to communicate 16 data between CPU 3 and network 61 over the voice band. The handheld device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the handheld device 53 includes a modem for voice band or broadband data communication. In the data-over-voice embodiment, a technique known as frequency division multiplexing may be implemented when the owner of the handheld device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, handheld device 53 is replaced with a cellular communication device (not shown) that is installed to vehicle 31. In yet another embodiment, the handheld device 53 may be a wireless local area network (LAN) device capable of communication over, for example (and without limitation), an 802.11g network (i.e., WiFi) or a WiMax network.

In one embodiment, incoming data can be passed through the handheld device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication. The system 1 may communicate the data received from the handheld device and/or the additional sources to one or more outputs. The one or more outputs may include, but is not limited to, the display 4, speaker 29, HUD (not shown), and/or a combination thereof.

Further, the CPU could be in communication with a variety of other auxiliary devices 65. These devices can be connected through wireless 67 or wired 69 connections. Auxiliary devices 65 may include, but are not limited to, personal media players, wireless health devices, portable computers, and the like.

Also, or alternatively, the CPU could be connected to a vehicle-based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, the handheld device (e.g., and without limitation, a mobile phone) or a remote computing system (e.g., and without limitation, a server) connected through the handheld device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired handheld device, then it is likely that the handheld device is not performing the process, since the handheld device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
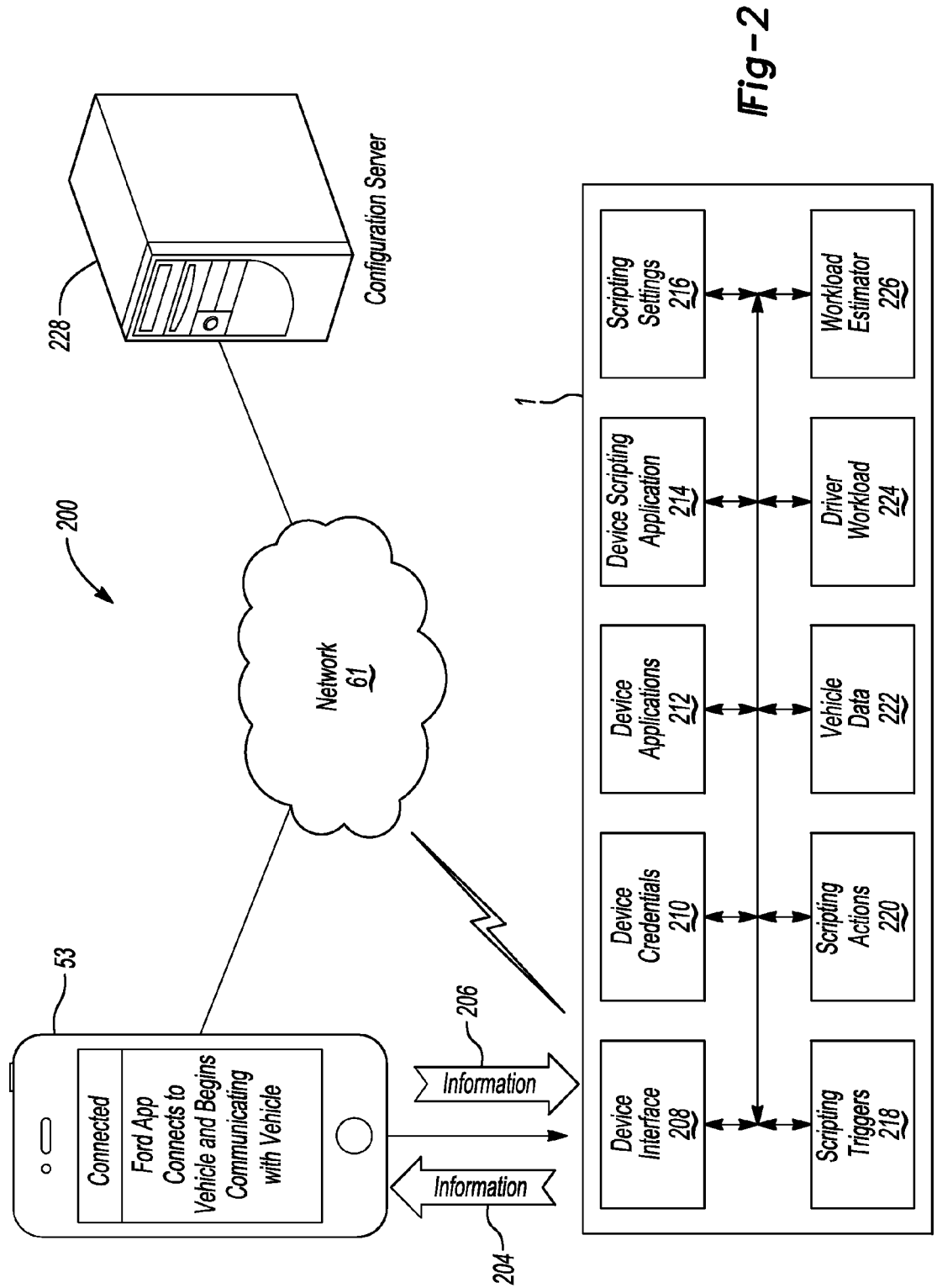
FIG. 2 illustrates an exemplary vehicle record system.
Figure 3:
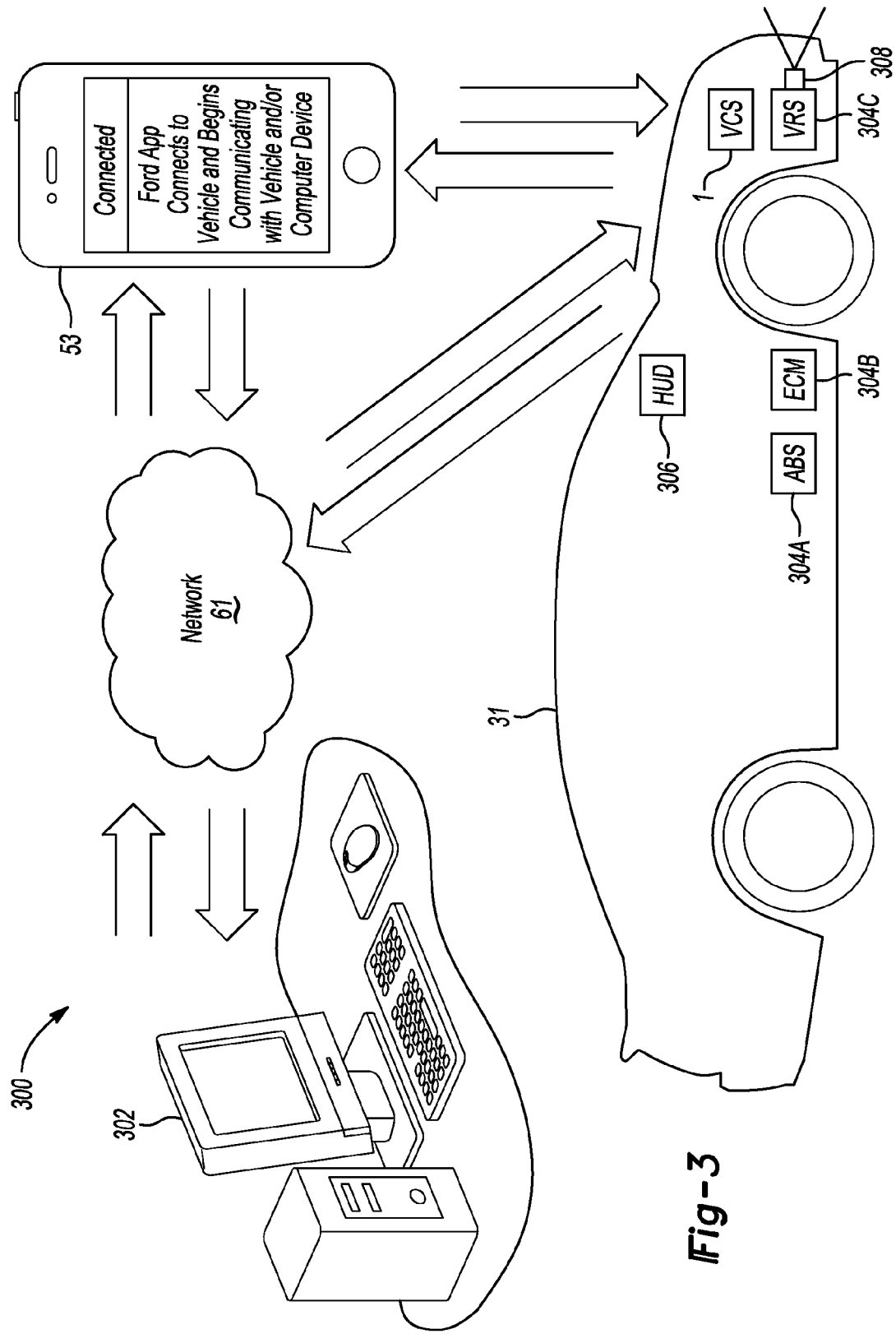
FIG. 3 illustrates an exemplary vehicle record system in communication with a computer device located remotely from a vehicle.

FIG. 2 illustrates an exemplary handheld device integration system 200. As illustrated, the system 200 includes the handheld device 53 connected to the network 61. The system 200 further includes a device interface 208 of the VCS 1 configured to access the handheld device 53 according to security credentials 210, transmit data 204 over the network 61 to the handheld device 53, and receive information 206 over the network 61 from the handheld device 53. The system 200 also includes device applications 212 configured to utilize the device interface 208 to manage applications at the handheld device 53 according to user input, and a device scripting application 214 configured to utilize the device interface 208 to communicate with the handheld device 53 according to scripting settings 216. Each scripting setting 216 may be associated with one or more scripting triggers 218 and one or more scripting actions 220. The system further includes a workload estimator 226 configured to receive vehicle data 222 and determine driver workload 224. The system 200 may also include a configuration server 228 configured to facilitate configuration of the scripting settings 216 remote from the vehicle 31. It should be noted that the illustrated system 200 is merely exemplary, and more, fewer, and/or differently located elements may be used. As one example, the system 200 may utilize a data connection of the handheld device 53 to facilitate the communication with the VCS 1 and the one or more vehicle systems as illustrated in FIG. 3.

The handheld device may communicate information with the VCS 1 for controlling functions, receiving data, and/or setting parameters of the vehicle. As illustrated, the handheld device 53 may be configured to receive information from the VCS 1 over the network 61. As some other examples, the handheld device 53 may be configured to receive the information 204 from the VCS 1 over other networks or types of network connection, such as over a BLUETOOTH connection, over a ZIGBEE wireless mesh network, or over another suitable type of network or network protocol for providing handheld device information 204. The handheld device information 204 may include commands to cause the handheld device 53 to perform actions, such as recording vehicle data, execute one or more applications, launch an application, and/or configure an application. The information 206 received from the handheld device may include messages configured to inform the vehicle occupant of the handheld device commands 204 and whether the handheld device commands 204 were successful. In some cases, the handheld device commands 204 may be configured to request information related to a vehicle record application executed at the handheld device 53 (e.g., whether the vehicle record application has requested one or more vehicle parameters to be recorded, and whether the application started receiving the one or more parameters), and the command responses 206 may be configured to return the requested status information back to the requester.

The device interface 208 may be configured to provide the VCS 1 with access to the features of the handheld device 53. To provide the access, the device interface 208 may be configured to expose an API allowing other applications of the VCS 1 to provide handheld device commands 204 to the handheld device 53 and receive command responses 206 from the handheld device 53 responsive to the provided handheld device commands 204. For example, in response to a request to record one or more vehicle parameters, the VCS 1 may provide the one or more vehicle parameters data to the handheld device 53.

The handheld device 53 may be configured to require security credentials 210 to allow the VCS 1 to provide device commands 204 to the handheld device 53. As some examples, the handheld device 53 may require an account name or username, and a password, passphrase, personal identification number, fingerprint, or other credential that may be used by the handheld device 53 to ensure that the VCS is authorized to access the handheld device features for the corresponding account or user. The VCS 1 may be configured to maintain and provide the security credentials 210 for the handheld device 53 to facilitate the connection and command execution using the device interface 208. In some cases, the device interface 208 may be further configured to maintain control information for the handheld device 53. For example, the device interface 208 may expose API information related to the handheld device 53 for which security credentials 210 are available, as well as information regarding the capabilities of the connected handheld device 53 (e.g., based on the model of handheld device 53, based on a query of the handheld device 53 by the device interface 208 for capability information).

The device applications 212 may include one or more applications installed at the VCS 1 and configured to make use of functionality of the handheld device 53 via the device interface 208. As an example, the device applications 212 may include a vehicle record feature application 212 configured to allow a user to select one or more vehicle parameters to record, and to store the data for the one or more vehicle parameters. As another example, the device applications 212 may include a vehicle HUD application 212 configured to allow the user to select one or more variables for display at the HUD via the vehicle record feature application.

The device scripting application 214 may be another example of a device application 212, and may be configured to allow a user to script the functions of the one or more applications 212 at the handheld device 53. The device scripting application 214 may include functionality to determine when specified trigger conditions 218 have occurred, and to perform specified actions 220 in response to triggering of the trigger conditions 218. These triggers and actions may be referred to herein as scripting settings 216.

The vehicle data 222 may include various inputs that may be monitored by the VCS 1 to receive indications of the vehicle 31 status. Exemplary vehicle data 222 may include, for example, speed, yaw, pitch, roll, lateral acceleration, temperature, and rain sensor inputs, as some possibilities. In some cases, the vehicle data 222 may include elements of data made available via the vehicle bus (e.g., via the controller area network (CAN)). In other cases, the vehicle data 222 may include elements of data that may be otherwise received from vehicle 31 sensors and systems (e.g., yaw information received from a stability system, rain sense information received from a weather detection system, etc., location information received from a positioning system, etc.). In yet further cases, the vehicle data 222 may include other information obtained from a connected mobile device (e.g., from handheld device 53 over Bluetooth, WiFi, etc.).

The trigger conditions 218 of the scripting settings 216 may be defined according to a relationship of one or more elements of vehicle data 222 to one or more predefined conditions. For example, in response to a request to start recording vehicle data at the handheld device 53, the vehicle data information may be output by the system based on a trigger condition 218. The trigger condition may be configured to define a relationship of vehicle speed, such as to define a condition that is triggered when the vehicle 31 is above a predefined speed (e.g., driving above 25 miles per hour) and/or the powertrain gear selection, (e.g., the powertrain is in a Drive gear) before enabling the vehicle record feature to store vehicle data.

The actions 220 of the scripting settings 216 may be defined according to an available feature of a connected handheld device 53. As an example, an action 220 may include sending a handheld device command 204 to a handheld device 53 to request a configuration of one or more vehicle parameters to monitor at the VCS 1, to enable recording of the one or more vehicle parameters at the VCS 1, and/or a combination thereof.

The device scripting application 214 may further include a user interface facilitating the configuration of the scripting settings 216, without requiring the user to install a dedicated device application 212 for each purpose. Further aspects of the user interface of the device scripting application 214 are discussed in detail below.

In some cases, the user interface of the device scripting application 214 may be made available to the user only when driver workload 224 permits the user to invoke the user interface. For example, the workload estimator 226 may be configured to receive the vehicle data 222 (e.g., via the CAN bus, from the vehicle systems or sensors, etc.) and identify a driver workload 224 based on the received vehicle data 222. In one possible approach, the workload estimator 226 may be configured to utilize a set of rules to determine a driving situation from the vehicle data 222, and to further determine the driver workload 224 according to the driving situation. More specifically, based on the received vehicle data 222, the workload estimator 226 may be configured to match the received vehicle data 222 against one or more conditions specified by the rules where each rule may be defined to indicate a particular driving situation indication encountered by the vehicle 31 when the conditions of the rule are satisfied. As some examples, rules may define a high traffic density condition according to criteria identifying many stops and starts in brake, accelerator or speed vehicle data 222, a merge condition according to vehicle data 222 indicative of a swerve maneuver at speed, and/or a parked condition according to a park vehicle gear selection indicated in the vehicle data 222, etc. Moreover, each driving situation may be associated with a corresponding driver workload 224 (e.g., parked vehicle situations associated with a low-level driver workload 224, merge situations associated with a mid-level driver workload 224, high traffic density associated with a high-level driver workload 224). As another example, the workload estimator 226 may associate certain conditions such as extreme weather with heightened driving demand, such that, as one possibility, the workload estimator 226 may associate certain weather conditions combined with a mid-level demand area (e.g., a merge situation) with a heightened workload estimation, such as a high-level driver workload 224. The driver workload 224 may include information indicating a relative level of current driver workload, such as by a value along a scale (e.g., from 1 to 5, from 0.01 to 1.00, etc.).

The configuration server 228 may be a server device configured to facilitate configuration of the scripting settings 216 through a user interface that is available outside of the vehicle 31 and regardless of driver workload 224. In an example, the configuration server 228 may be configured to provide a web-based front end user interface (e.g., one or more web pages) or data for use by a thick-client user interface, allowing for the selection of scripting settings 216, such as trigger conditions and actions to be performed by the vehicle 31 resulting from occurrence of the trigger conditions. To perform the configuration, the configuration server 228 may be configured to receive the scripting settings 216 from the vehicle 31, provide a user interface through which the scripting settings 216 may be updated, and provide the updated scripting settings back to the vehicle 31 for use by the device scripting application 214. Further details of the integration of the handheld device 53 into the vehicle 31 system are discussed in detail below with respect to FIGS. 3-9.

FIG. 3 illustrates an exemplary vehicle record system 300 in communication with a computer device. As illustrated, the system 300 includes a remote computer device 302 and/or a handheld device 53 in communication with the VCS 1. In one embodiment, the computer device 302 may be in communication with the VCS 1 via the handheld device 53. In another embodiment, the handheld device 53 may be in direct communication with the VCS 1 using wireless and/or wired technology. The handheld device 53 may comprise one or more applications configured to communicate with the computer device 302, the VCS 1, and/or a combination thereof.

The one or more applications at the handheld device 53 may include, but is not limited to, the device interface 208, the device applications 212 configured to utilize the device interface 208, and/or a combination thereof. The handheld device 53 may be used to configure one or more applications 212 for execution at the VCS 1 according to user input at the device. The handheld device 53 may receive notification from the VCS using the device scripting application 214.

The computer device 302 may be a desktop computer 302 located remotely from the vehicle 31. The computer device 302 may be in communication with the VCS 1 via the network 61 connection. The computer device 302 may be used to configure the one or more applications 212 for execution at the VCS 1. For example, the computer device 302 may comprise the vehicle record feature application 212. The computer device 302 may configure the vehicle record feature application 212 by allowing a user to select one or more vehicle parameters to be monitored at the vehicle. The computer device 302 may also configure the vehicle record feature application 212 to set a specific trigger to begin recording of the one or more vehicle parameters.

A user may be able to set a trigger such that the vehicle record feature application 212 may begin recording one or more vehicle parameters once the trigger is set. For example, the trigger may be a certain location, vehicle speed, time of day, and/or a combination thereof. In response to the trigger, the VCS 1 may begin to monitor the one or more vehicle parameters. The one or more vehicle parameters may be displayed via the HUD 306, the display 4, and/or a combination thereof. The VCS 1 may transmit the one or more vehicle parameters to the handheld device 53. The handheld device 53 may receive data associated with the one or more vehicle parameters and store the received data using memory hardware at the device. In another example, the handheld device 53 may display the vehicle parameters as a mirrored image of the HUD 306, display 4, and/or a combination thereof.

The one or more vehicle parameters may include vehicle information from several subsystems 304 communicating with the VCS 1 over the vehicle network (e.g., CAN Bus). The subsystems may include, but are not limited to, an anti-lock braking system (ABS) 304-A, an engine control module (ECM) 304-B, and a vehicle record system 304-C. The ECM 304-B may monitor one or more parameters related to the powertrain performance. The ABS 304-A may monitor one or more parameters related to vehicle braking and/or ride handling. The VRS 304-C may comprise a video camera 308 used to capture video of the vehicle being driven.

The HUD 306 may receive the one or more vehicle parameters via the vehicle network. The HUD 306 may provide a transparent display outputting the one or more vehicle parameters at the driver's front windshield viewpoint. The one or more vehicle parameters presented at the HUD and/or the video being captured via the camera 308 may be transmitted to the handheld device 53 for storage by non-volatile memory at the device.

Figure 4:
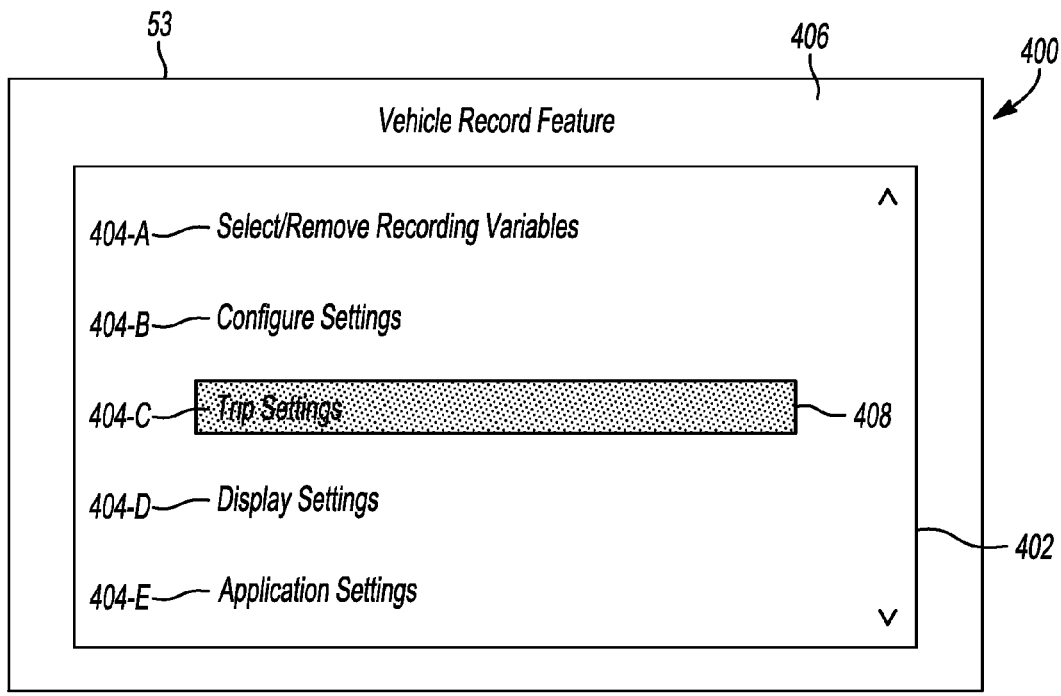
FIG. 4 illustrates an exemplary user interface of the vehicle record system from which the vehicle record feature application may be configured.

FIG. 4 illustrates an exemplary user interface 400 of the vehicle record system from which the vehicle record feature application may be configured. The user interface 400 may be presented at the handheld device 53, and may include a list control 402 configured to display selectable list entries 404-A through 404-E (collectively 404) of the vehicle record feature. The vehicle control feature available on the nomadic device 53 may be communicated to the VCS 1 via a wired and/or wireless connection. For example, the user interface 400 and the other user interfaces discussed herein may be displayed elsewhere, such as by way of a connected application executed by the VCS 1 via a paired connection with the nomadic device 53. The user interface 400 may also include a title label 406 to indicate to the user that the user interface 400 is for utilizing the connected application of the VCS 1.

As illustrated, the selectable list 402 of the vehicle feature application includes an entry 404-A for a select/remove recording variables, an entry 404-B to configure settings, and an entry 404-C for trip settings. The list control 402 may operate as a menu, such that a user of the user interface 400 may be able to scroll through list entries of the list control 402 (e.g., using up and down arrow buttons and a select button to invoke the selected menu item 408). In some cases, the list control 402 may be displayed on a user interface screen of the nomadic device 53, such that the user may be able to touch the list control 402 to select and invoke a menu item. For example, when the entry 404-C for the trip settings is selected, the nomadic device 53 may initiate the trip settings.

The list control 402 may include additional entries. For example, an entry 404-D for display settings, may be configured to cause the nomadic device 53 to configure what variables may be displayed at the HUD 306 and/or vehicle display 4 based on a paired connection with the VCS 1. As another example, the "Application Settings" entry 404-E, when invoked, may be configured to cause the nomadic device 53 to display a user interface of settings for the application functionality generally.

The VCS 1 may receive a record event from the vehicle record feature application configured at the nomadic device 53 using the device interface 208. The record event may include a configured file letting the VCS 1 know what vehicle parameters to record, when to start the recording, what information to output to the driver, and/or a combination thereof. The VCS 1 may enable communication with the nomadic device via the device credentials 210. The vehicle record feature application 212 may be executed at the VCS 1 and configured to enable the use of hardware and/or software applications at the nomadic device 53 via the device interface 208.

For example, the VCS 1 may receive a configuration of a vehicle record event from the nomadic device 53. The vehicle record event may be executed at the VCS 1 via the vehicle record feature application 212. The VCS 1 may output data via the HUD 306 and/or display 4 based on the vehicle record feature application 212. The VCS 1 may begin executing the vehicle record feature based on the device scripting application 214. The device scripting application 214 may receive one or more specified trigger conditions 218 from the nomadic device 53. The nomadic device may provide a user interface to allow the configuration of the trigger conditions 218. The trigger conditions 218 may be configured under the "Trip Settings" entry 404-C which will be discussed in FIG. 5. In another example, the trigger conditions 218 may be configured at the VCS 1. In response to the execution of the vehicle record feature application 212, the VCS 1 may transmit the recorded data to the nomadic device for storage at the non-volatile memory of the device.

Figure 5:
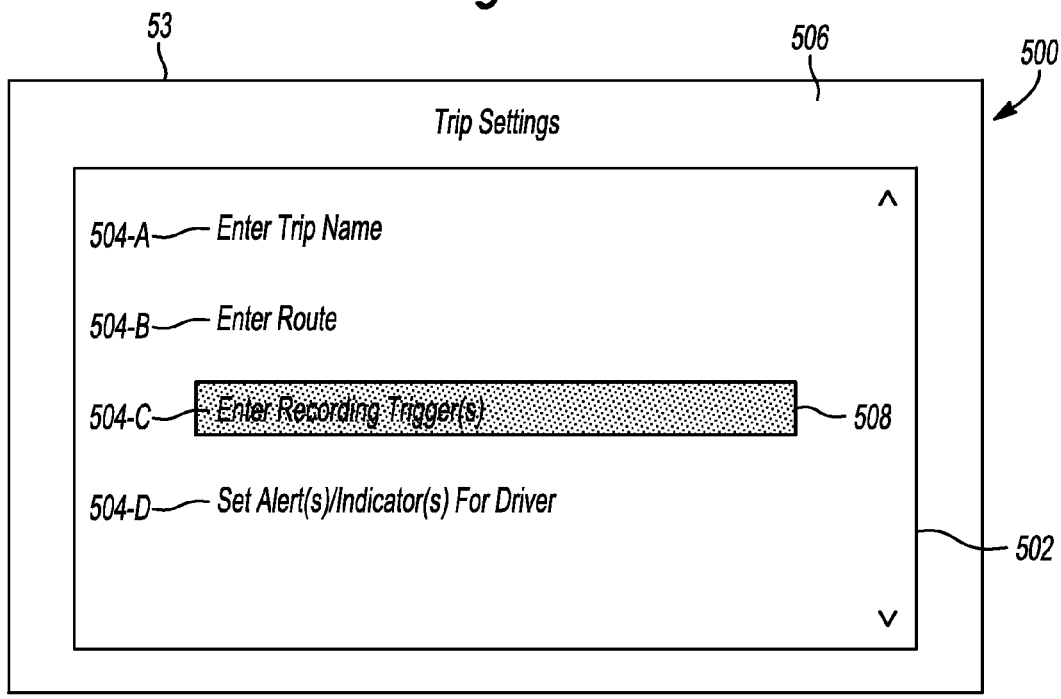
FIG. 5 illustrates an exemplary user interface of the vehicle record feature application.

FIG. 5 illustrates an exemplary user interface 500 of the vehicle record feature application. As with the user interface 400, the user interface 500 may also be presented at the handheld device 53 via a display. The user interface 500 may include a list control 502 configured to display a selectable list of entries, where each entry is associated with a corresponding application command 504-A through 504-D (collectively 504). Each of the commands 504 may indicate a feature available for use by the VCS 1 in communication with handheld device 53 via the device interface 208. The user interface 500 may also include a title label 506 to indicate to the user that the user interface 500 is the trip settings for the vehicle record feature application 212 (e.g., as invoked via selection 408 of the entry 404-C from the user interface 400).

With respect to the commands 504 of the list control 502, as one example, the list control 502 may include a command 504-A that, when invoked, is configured to cause the handheld device 53 to receive a trip name to label the file that stores the trip data received from the VCS 1. As another example, the list control 502 may include a command 504-B that, when invoked, is configured to cause the handheld device 53 to provide the VCS one or more route destinations that may be recorded via software and hardware at the VCS. In response to the route destination provided to the VCS, the handheld device may receive data from vehicle parameters being recorded during the route. As a further example, the list control 502 may include a command 504-C that, when invoked, is configured to cause the handheld device 53 to receive recording trigger event(s) to communicate to the VCS 1 when the vehicle record feature should start recording the data.

The VCS 1 may receive the trip settings 506 from the handheld device 53 for output at the HUD 306 and/or vehicle display 4 via a communication link. A user may be able to configure an alert for display to the driver when command 504-D is invoked at the handheld device 53. For example, the alert and/or indicator configured for output to the driver may include a message providing information that the record event has begun. In another example, the alert and/or indicator may include a message to limit vehicle data presented to the driver at the HUD 306 and/or display 4 based on driver workload 224, workload estimator 226, and/or a combination thereof.

As with the list control 402, the list control 502 may also operate as a menu, such that a user of the user interface 500 may be able to scroll through list entries of the list control 502 (e.g., using up and down arrow buttons and a select button to invoke the selected menu item 508). Upon touch or button selection of one of the commands 504, the handheld device, VCS 1 and a combination thereof may be configured to perform the selected action.

Figure 6:
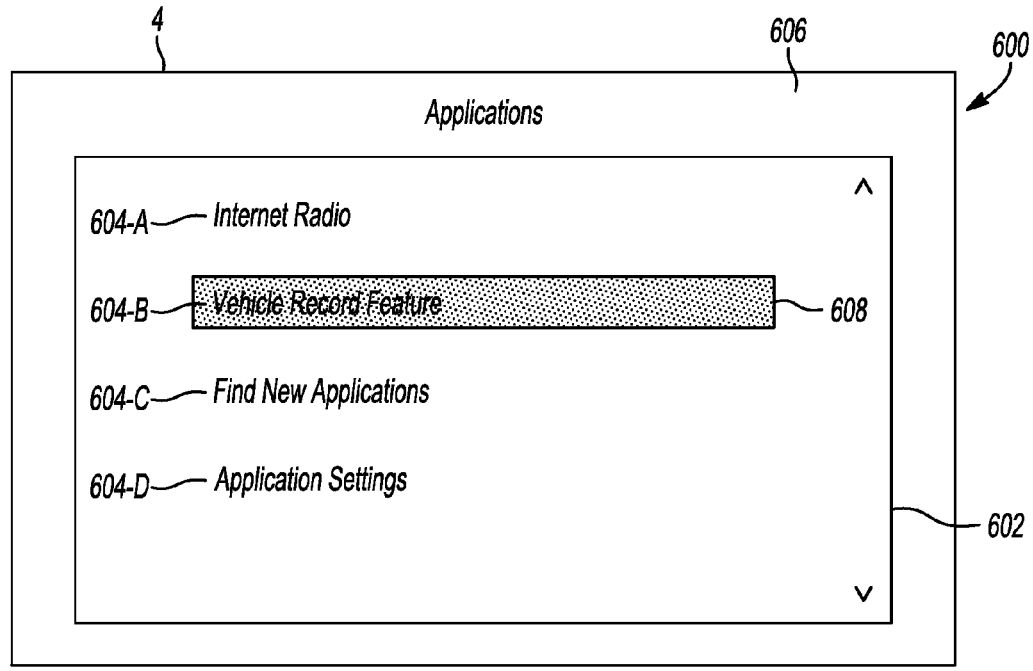
FIG. 6 illustrates an exemplary user interface of the vehicle record feature at a vehicle display.

FIG. 6 illustrates an exemplary user interface 600 of the vehicle record feature at the vehicle display 4. The user interface 600 may be presented in the vehicle 31 via the display 4, and may include a list control 602 configured to display selectable list entries 604-A through 604-D (collectively 604) of the applications that are available on the VCS 1 (or via a connected handheld device 53). In other examples, the user interface 600 and the other user interfaces discussed herein may be displayed elsewhere, such as by way of a connected application executed by a handheld device 53 paired with the VCS 1. The user interface 600 may also include a title label 606 to indicate to the user that the user interface 600 is for utilizing the connected applications of the handheld device 53.

As illustrated, the selectable list 602 of the connected application includes an entry 604-A for an Internet radio application and an entry 604-B for the vehicle record feature application 212. The list control 602 may operate as a menu, such that a user of the user interface 600 may be able to scroll through list entries of the list control 602 (e.g., using up and down arrow buttons and a select button to invoke the selected menu item 608). In some cases, the list control 602 may be displayed on a touch screen display 4, such that the user may be able to touch the list control 602 to select and invoke a menu item.

The list control 602 may further include additional entries. For example, the "Find New Applications" entry 604-C, when invoked, may be configured to cause the VCS 1 to query for an updated listing of the applications available to the system (e.g., on the VCS 1, via installed on a connected handheld device 53, etc.). As another example, the "Application Settings" entry 604-D, when invoked, may be configured to cause the VCS 1 to display a user interface of settings for the application functionality generally.

Figure 7:
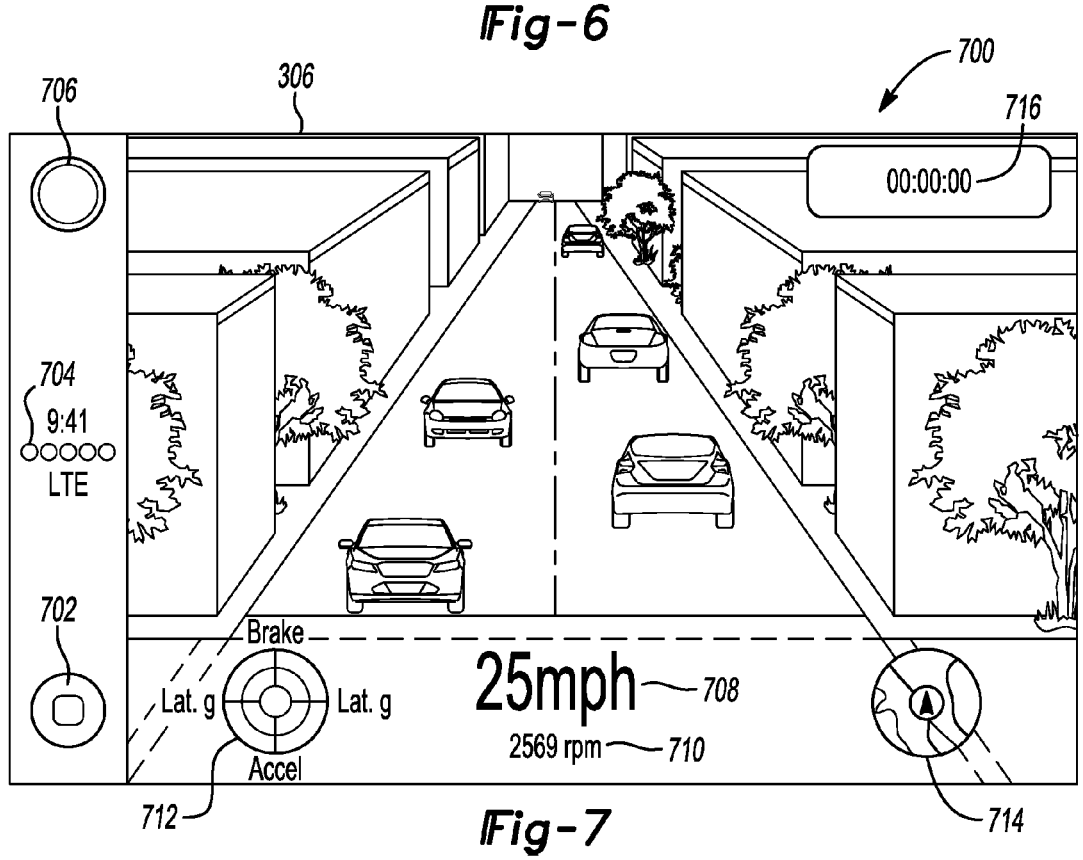
FIG. 7 illustrates an exemplary projection of the vehicle record feature at a heads-up display.

FIG. 7 illustrates an exemplary projection 700 of the vehicle record feature at 1 the HUD 306. The HUD 306 may comprise a display unit installed at a center potion of a dash board. For example, the HUD 306 may include an optical system such as a lens, and a catoptric system using a windshield glass. The vehicle record feature 212 may provide one or more parameters enlarged by the optical system and are displayed as a virtual image at a front position of the windshield glass.

As shown in FIG. 7, the one or more parameters from the vehicle record feature application 212 are perceived by a driver as if the parameters are displayed 700 at a fixed distance in front of the vehicle. The one or more parameters displayed 700 by the HUD 306 may be selected at the handheld device 53, vehicle display 4, and/or a combination thereof. The HUD 306 may output a vehicle record feature icon 702 to visually inform the driver that the vehicle feature application 212 is enabled at the VCS. The display may also provide an icon 704 to inform the driver that a handheld device 53 is connected, and the handheld device signal strength connection to the cellular network.

The HUD 306 may display a record icon 706 to indicate to the driver whether the vehicle record feature has been enabled to start recording the one or more parameters. For example, if a trigger condition has been satisfied, the record icon 706 may be displayed to inform the driver that the vehicle record feature is recording one or more parameters. In another example, the driver may enable the vehicle record feature application 212 by a selection at the display 4, a voice command, a button press, and/or a combination thereof.

As illustrated, the HUD 306 may provide miles per hour (MPH) 708, revolutions per minute (RPM) 710, longitudinal and lateral acceleration 712, current location 714, recording time lapse 716, and/or a combination thereof. The VCS 1 may provide a mirror image of the HUD display to the handheld device using the one or more control modules 304 monitoring the parameters and the vehicle record system 304-C to capture the video of the vehicle being driven. In one example, the video being recorded via the vehicle record system may provide images similar to the point of view of the driver. The handheld device 53 may store the parameters and the video images received from the VCS 1. In another embodiment, the vehicle 31 may not comprise a HUD; however, the VCS 1 may provide the parameters and video images to the handheld device 53 for display and/or storage.

The VCS may manage the information presented on the HUD based on driver workload 224, workload estimator 336, user configuration, and/or a combination thereof. For example, the HUD may not provide the one or more parameters for display until the VCS receives a request to begin recording the parameters and/or video. In another example, the HUD may not present vehicle speed unless the vehicle speed exceeds a threshold value.

Figure 8:
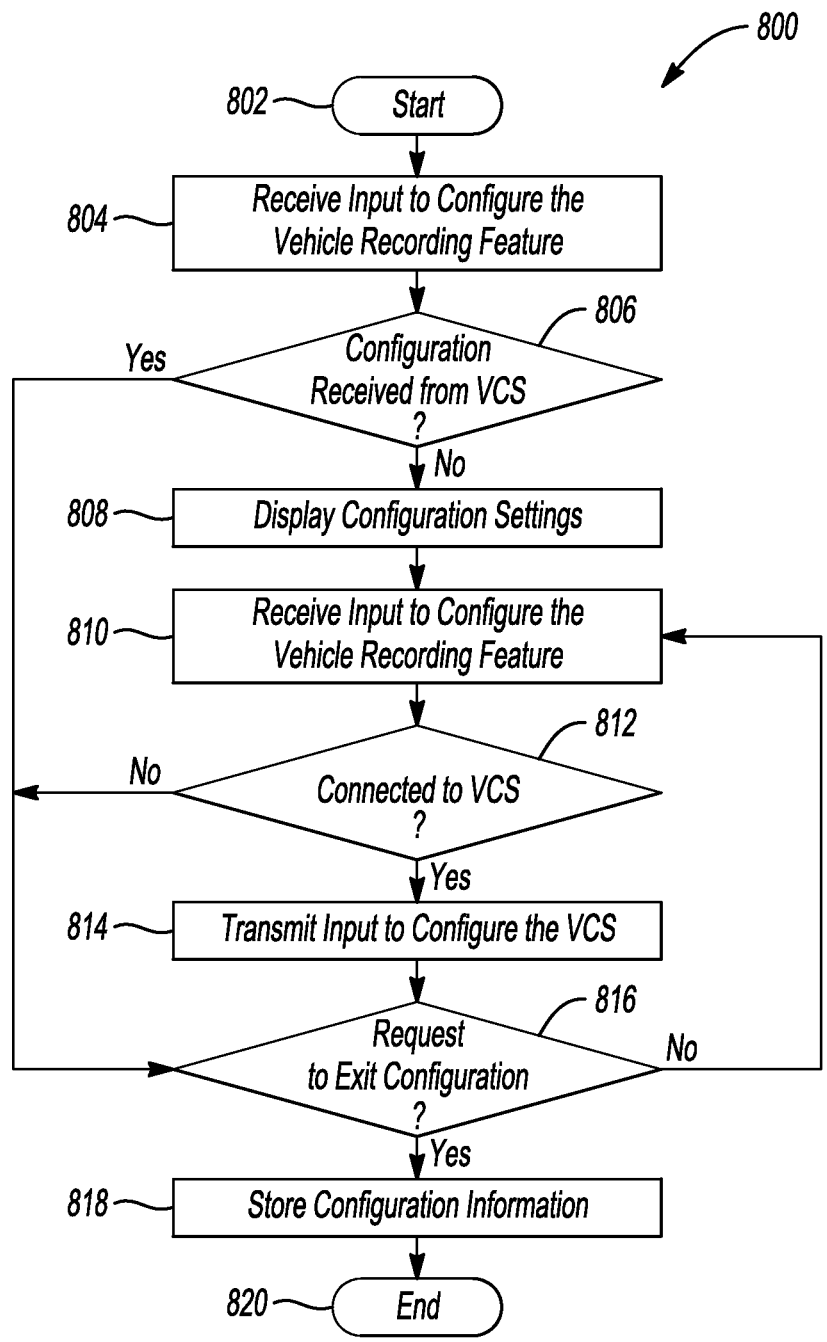
FIG. 8 illustrates an exemplary process for the configuration of the vehicle record feature by a nomadic device.

FIG. 8 illustrates an exemplary process for the configuration of the vehicle record feature by the handheld device 53. The process 800 may be implemented using software code contained within the VCS 1, ABS 304-A, ECM 304-B, VRS 304-C, and/or a combination thereof. In other embodiments, the process 800 may be implemented in other vehicle controllers, or distributed among multiple vehicle controllers.

Referring again to FIG. 8, the vehicle 31 and its components illustrated in FIG. 1, FIG. 2, and FIG. 3 are referenced throughout the description of the method to facilitate understanding of various aspects of the present disclosure. The process 800 of recording one or more parameters based on a route, trigger event, driver workload, and/or combination thereof may be implemented through a computer algorithm, machine executable code, or software instructions programmed into a suitable programmable logic device(s) of the vehicle, such as the vehicle control module, the device control module, the ABS 304-A, the ECM 304-B, the VRS 304-C, another controller in communication with the vehicle computing system, or a combination thereof. Although the various operations shown in the flowchart diagram 800 appear to occur in a chronological sequence, at least some of the operations may occur in a different order, and some operations may be performed concurrently or not at all.

In operation 802, the vehicle record feature configuration process by the handheld device 53 may be enabled by a communication connection with the VCS 1, a start request received at a user interface, and a combination thereof. The handheld device 53 may initialize one or more applications for execution of the vehicle record feature configuration process using software and hardware at the device. The vehicle record feature may receive input requesting configuration of the application in operation 804.

In operation 806, the vehicle record feature may determine if a configuration has been received from the VCS 1. For example, in response to the communication connection with the VCS 1, the process 800 may receive a request to configure the one or more parameters based on input received from the VCS 1. The VCS 1 may receive a vehicle record feature configuration request via input at the display 4. In another example, the VCS 1 may receive the vehicle record feature configuration request from a handheld device 53 in communication with the VCS 1.

In operation 808, if the vehicle record feature configuration has not been received from the VCS 1, the process 800 may display the configuration settings at a user interface of the handheld device 53. The vehicle record feature may receive input to configure the vehicle record feature in operation 810. For example, the user may select parameters to record, parameters to display, trigger conditions to begin recording, workload conditions to begin recordings, and/or a combination thereof.

In operation 812, in response to received input for the configuration of the vehicle record feature application, the handheld device 53 may search for a connection with the VCS 1. If the VCS 1 is connected to the handheld device 53, the configuration input for the vehicle record feature application may be transmitted to the VCS 1 in operation 814.

In operation 816, once configuration of the vehicle record feature is complete, the handheld device may request to exit the configuration of the application. If the configuration is complete, the handheld device may store the configuration information in operation 818. For example, the handheld device may transmit the vehicle record feature configuration at the next established communication link with the VCS 1. The handheld device 53 may end the process if the one or more configuration menus have been completed and/or the process is being requested to end at the user interface in operation 820.

Figure 9:
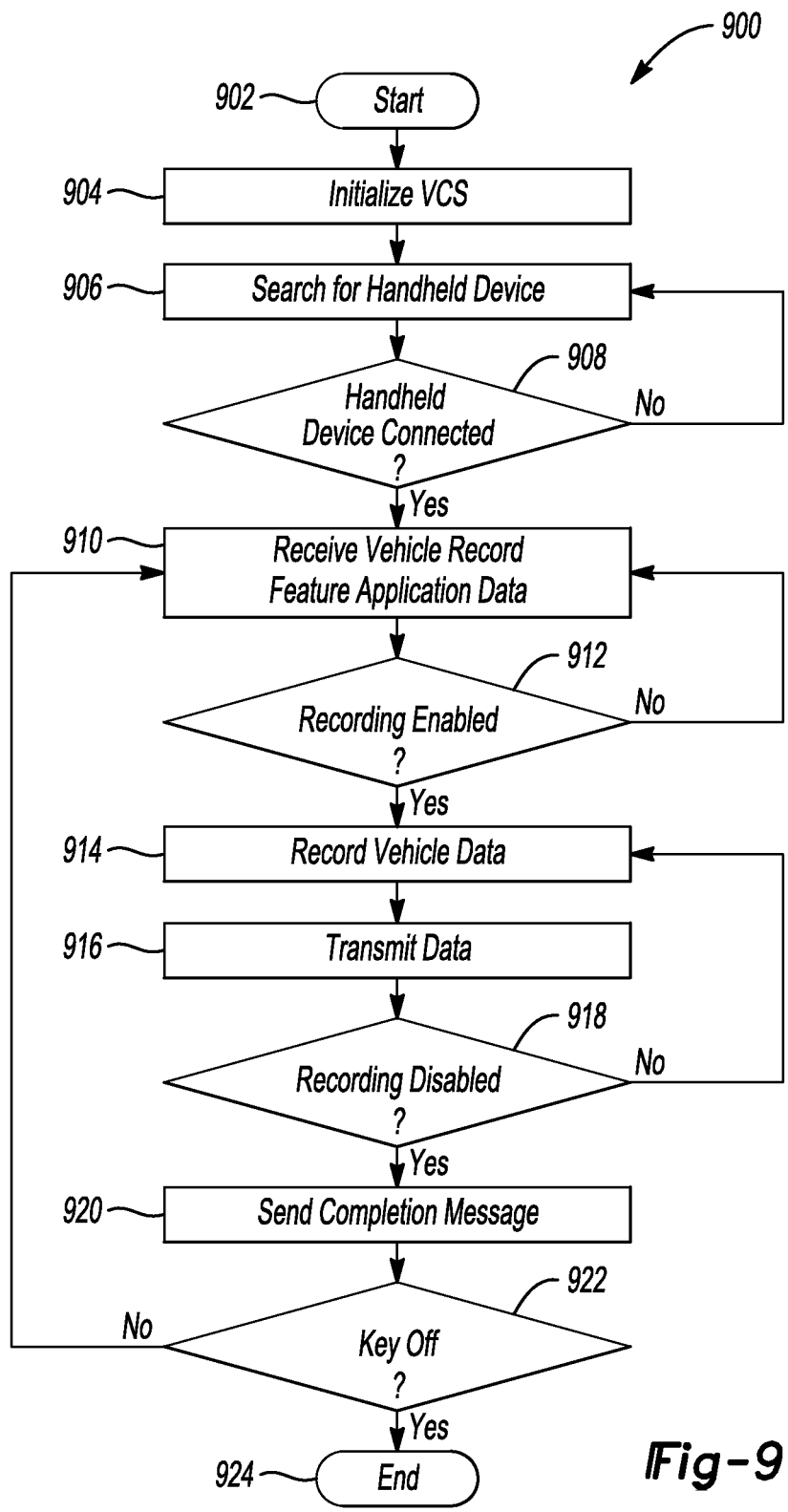
FIG. 9 illustrates an exemplary process for the execution of the vehicle record feature application by the vehicle.

FIG. 9 illustrates an exemplary process 900 for the execution of the vehicle record feature application by the vehicle. The process 900 may be implemented using software code contained within the VCS 1, the handheld device 53, and/or a combination thereof. The process 900 of the VCS 1 executing the vehicle record feature and storing data at the handheld device 53 may be implemented through a computer algorithm, machine executable code, or software instructions programmed into a suitable programmable logic device(s) of the vehicle, such as the vehicle control module, the handheld device 53, another controller in communication with the vehicle computing system, or a combination thereof.

In operation 902, the VCS 1 may be enabled by a start request received from one or more mechanisms including, but not limited to, a vehicle key, a vehicle key fob, the handheld device 53, and/or a combination thereof. The VCS 1 may initialize one or more applications to enable execution of the vehicle record feature in operation 904.

In operation 906, the VCS 1 may begin to search for a communication link with the handheld device 53. The communication link may include, but is not limited to, Bluetooth, Bluetooth Low Energy, WiFi, and/or any other wireless communication technology. If the handheld device 53 is detected, the VCS 1 may determine if a connection is made in operation 908. For example, the handheld device 53 may have to perform a pairing process before connecting to the VCS 1.

In operation 910, in response to the handheld device 53 establishing communication with the VCS 1, the process may query the handheld device 53 for vehicle record feature application data. The VCS 1 may receive at least a portion of vehicle record feature application data from the handheld device 53. For example, if the handheld device 53 includes a pre-configured vehicle record event, the VCS 1 may receive the configured vehicle record event in the communication data via the handheld device 53.

In operation 912, the VCS 1 may receive a recording request based on at least one of a driver input request, a trigger event, route destination data, driver workload, and/or a combination thereof. If a record request is received, the VCS 1 may begin to record the one or more parameters and/or video images of the drive event in operation 914. For example, the pre-configured vehicle record event may request a custom selection of vehicle parameters to record during the drive event. The VCS 1 may transmit the recorded data including the one or more parameters and/or the video images to the connected handheld device 53 in operation 916. In another example, the VCS 1 may begin recording the data and temporarily store the data until a recognized handheld device establishes communication with the VCS 1.

In operation 918, the VCS 1 may continuously record the parameters and/or video until a recording disable request is received. The recording disable request may be based on a driver input request, a trigger event, route destination data, driver workload, the pre-configured vehicle record event, and/or a combination thereof. The VCS 1 may transmit a record completion message 920 to the handheld device 53. In another example, the VCS 1 may transmit a completion message 920 to a remote computer in communication with the VCS 1 via a network connection.

In operation 922, the VCS 1 may monitor if a key-off event is detected. If a key-off event is not detected, the VCS 1 may continue to execute the vehicle record feature application. In response to a key-off event, the VCS 1 may end the process of the vehicle record feature application in operation 924. In one example, in response to a disconnected communication link with the handheld device before transferring the recorded data is complete, during a key-off event the system may store the data until the next key cycle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a heads-up display (HUD) configured to output vehicle parameters transmitted by a vehicle network; and
   at least one processor in communication with the HUD and in wireless communication with a mobile phone, the at least one processor configured to
   transmit at least a portion of the vehicle parameters displayed by the HUD during a record event to the mobile phone device for storage of the record event.

2. The system of claim 1, the at least one processor being further configured to receive a configuration from the mobile phone designating the vehicle parameters transmitted by the vehicle network and displayed by the HUD to be transmitted to the mobile phone during the record event.

3. The system of claim 1, wherein the configuration from the mobile phone is at least one of a trigger condition to start the record event, a trip name to save the record event, and a predefined alert for output at the HUD.

4. The system of claim 3, wherein the trigger condition is at least one of a predefined location, predefined speed limit, predefined time of day, predefined driver, and a record request input received at a user interface.

5. The system of claim 3, wherein the trip name is used by the mobile phone to store data associated with the monitored vehicle parameters during the record event.

6. The system of claim 3, wherein the predefined alert limits output of the vehicle parameters at the HUD if a vehicle speed exceeds a predetermined threshold.

7. The system of claim 1, wherein the at least one processor is further configured to enable the record event based on at least one of a trigger condition and a record request received at a user interface.

8. The system of claim 1, wherein the mobile phone is configured to save data associated with the parameters under a trip name, and enable playback of the parameters at the device.

9. The system of claim 1, further comprising a vehicle camera configured to capture video of the record event and transmit the captured video associated with the record event to the mobile phone.

10. A vehicle recording event method comprising:
receiving, via a vehicle computing system, a configuration from a wirelessly connected mobile phone to output a vehicle parameter broadcast over a vehicle network at a vehicle display,
in response to a trigger condition, recording the vehicle parameter by the vehicle computing system during a vehicle drive event based on the configuration; and
transmitting the recorded vehicle parameter to the mobile phone subsequent to completion of the recording.

11. The method of claim 10, wherein the configuration from the mobile phone is at least one of a trip name to save the record event and a predefined alert for output at the vehicle display.

12. The method of claim 11, wherein the trip name is used by the mobile phone for storing data associated with the parameters during the record event.

13. The method of claim 11, wherein the predefined alert is a driver workload level to limit output of vehicle parameters at the vehicle display.

14. The method of claim 10, wherein the trigger condition is at least one of a predefined location, predefined speed limit, predefined time of day, predefined driver, and a record request received at a user interface.

15. The method of claim 10, wherein the mobile phone is configured for saving data associated with the parameters under a trip name, and enabling playback of the parameters at the mobile phone.

16. The method of claim 10, further comprising a vehicle camera configured for capturing video of the record event.

17. The method of claim 16, further comprising transmitting the captured video associated with the record event to the mobile phone.

18. A handheld device comprising:
a user-interface display configured to receive an event identification and select vehicle parameters for output at a vehicle display; and
a processor in wireless communication with a vehicle computing system, (VCS) and configured to,
transmit configuration data having the selected parameters to the VCS,
in response to a record event, receive data associated with the selected vehicle parameters from the VCS, and
store the data under the event identification.

19. The handheld device of claim 18, wherein the processor is further configured to enable playback at the user-interface display of the vehicle parameters stored under the event file name.

20. The handheld device of claim 18, wherein the data associated with the vehicle parameters includes a video of the record event.

* * * * *